(12) United States Patent
Peterkin et al.

(10) Patent No.: US 10,933,794 B1
(45) Date of Patent: Mar. 2, 2021

(54) HEATED SLURRY TRANSPORT SYSTEM

(71) Applicant: Magtec Alaska, LLC, Kenai, AK (US)

(72) Inventors: Ryan A. Peterkin, Kenai, AK (US); William J. Galloway, Kenai, AK (US)

(73) Assignee: Magtec Alaska, LLC, Kenai, AK (US)

( * ) Notice: Subject to any disclaimer, the term of this patent is extended or adjusted under 35 U.S.C. 154(b) by 0 days.

(21) Appl. No.: 17/061,946

(22) Filed: Oct. 2, 2020

(51) Int. Cl.
B60P 3/22 (2006.01)
B65D 81/38 (2006.01)
B65D 88/74 (2006.01)
B65D 81/20 (2006.01)

(52) U.S. Cl.
CPC ........... *B60P 3/2295* (2013.01); *B60P 3/2205* (2013.01); *B60P 3/226* (2013.01); *B65D 81/2015* (2013.01); *B65D 81/3813* (2013.01); *B65D 88/744* (2013.01); *B65D 88/748* (2013.01)

(58) Field of Classification Search
CPC ....... B60P 3/2295; B60P 3/2205; B60P 3/226; B65D 81/2015; B65D 81/3813; B65D 88/744; B65D 88/748
USPC .......................................................... 137/340
See application file for complete search history.

(56) References Cited

U.S. PATENT DOCUMENTS

| | | | | |
|---|---|---|---|---|
| 1,381,669 A | * | 6/1921 | Schreiber | B65D 88/744 165/142 |
| 1,394,692 A | * | 10/1921 | Stocker | B65D 88/744 165/103 |
| 1,866,544 A | * | 7/1932 | Cleaver | B65D 88/744 126/343.5 A |
| 1,914,585 A | * | 6/1933 | Smith | B65D 88/744 165/82 |
| 2,145,614 A | * | 1/1939 | Stambaugh | B65D 88/744 126/343.5 A |
| 2,558,648 A | * | 6/1951 | Gausmann | B65D 88/744 105/358 |
| 2,624,553 A | * | 1/1953 | Thompson | B65D 88/744 126/343.5 A |
| 2,696,086 A | | 12/1954 | Jones | |

(Continued)

FOREIGN PATENT DOCUMENTS

| | | | | |
|---|---|---|---|---|
| EP | 381272 A | * | 8/1990 | |
| GB | 489120 A | * | 7/1938 | ............ B60P 3/2295 |

(Continued)

OTHER PUBLICATIONS https://en.wikipedia.org/wiki/Vacuum_truck; Wikipedia Webpage Article "Vacuum Truck"; Last Edited Apr. 5, 2020; Received Sep. 23, 2020.

(Continued)

*Primary Examiner* — Hilary L Gutman
(74) *Attorney, Agent, or Firm* — Neustel Law Offices

(57) ABSTRACT

A heated slurry transport system for receiving, transporting and unloading a cuttings slurry in a non-frozen manner in cold weather environments. The heated slurry transport system generally includes a portable tank having an interior surface, at least one wall, and a rear door. A layer of insulation surrounds at least a portion of the portable tank to help retain heat within the portable tank. A heating unit is attached to the portable tank and adapted to heat a fluid that is transferred through at least one heat loop attached to the portable tank to heat the interior of the portable tank and the contents of the portable tank.

20 Claims, 9 Drawing Sheets

(56) References Cited

U.S. PATENT DOCUMENTS

| | | | |
|---|---|---|---|
| 3,228,466 A * | 1/1966 | Carleton | B65D 88/744 165/169 |
| 3,255,517 A * | 6/1966 | La Barbera | B65D 88/744 29/890.03 |
| 3,595,307 A * | 7/1971 | Mowatt-Larssen | B65D 88/744 165/47 |
| 3,638,443 A | 2/1972 | Maurer | |
| 3,685,458 A * | 8/1972 | Price | B65D 88/744 105/358 |
| 4,476,788 A * | 10/1984 | Loevinger | B65D 88/744 105/358 |
| 4,530,288 A * | 7/1985 | Loevinger | B65D 88/744 105/358 |
| 5,133,041 A * | 7/1992 | Richter | B60H 1/03 123/3 |
| 5,564,509 A | 10/1996 | Dietzen | |
| 6,179,070 B1 | 1/2001 | Dietzen | |
| 6,345,509 B1 | 2/2002 | Garlov | |
| 8,109,327 B2 | 2/2012 | Sulc | |
| 8,328,290 B2 | 12/2012 | Malatesta | |
| 8,485,132 B2 | 7/2013 | Kong | |
| 9,061,623 B2 | 6/2015 | MacLean | |
| 9,233,792 B2 * | 1/2016 | Kooi | B65D 88/128 |
| 9,386,845 B2 | 7/2016 | Wu | |
| 9,482,460 B2 | 11/2016 | Laudet | |
| 2002/0195019 A1 * | 12/2002 | Woodall | B61D 5/04 105/358 |
| 2007/0000545 A1 * | 1/2007 | Cannon | B60P 1/58 137/560 |
| 2007/0012680 A1 * | 1/2007 | Grisoni | B65D 88/748 219/469 |
| 2010/0224640 A1 * | 9/2010 | Nothof | B60P 3/00 220/694 |
| 2011/0211818 A1 * | 9/2011 | Grady | B60P 3/2295 392/444 |
| 2012/0073675 A1 * | 3/2012 | Dupuis | B65D 90/00 137/238 |
| 2012/0138630 A1 * | 6/2012 | Kinsey, III | B65D 90/00 222/1 |
| 2015/0143840 A1 * | 5/2015 | Ma | B60P 3/20 62/457.2 |
| 2017/0297814 A1 * | 10/2017 | Goldstein | B65D 88/744 |
| 2018/0104622 A1 | 4/2018 | Dawson | |
| 2019/0263578 A1 * | 8/2019 | Beydoun | B01F 7/00975 |
| 2019/0316819 A1 | 10/2019 | Savenstrand | |

FOREIGN PATENT DOCUMENTS

| | | | | |
|---|---|---|---|---|
| GB | 627318 A | * | 8/1949 | B60P 3/2295 |
| WO | WO9113817 A | * | 9/1991 | |
| WO | WO-0136296 A1 | * | 5/2001 | B65D 90/0093 |
| WO | WO-2013141707 A2 | * | 9/2013 | B65D 88/748 |
| WO | WO-2013187997 A1 | * | 12/2013 | F25D 11/003 |
| WO | WO-2014137230 A2 | * | 9/2014 | B65D 88/744 |
| WO | WO-2015069564 A1 | * | 5/2015 | B65D 88/744 |

OTHER PUBLICATIONS https://dragonproductsltd.com/roll-off-equipment-2/vacuum-box/; Dragon Products, LTD Vacuum Box Webpage; Received Sep. 23, 2020.

https://dragonproductsltd.com/wp-content/uploads/bsk-pdf-manager/Vacuum_Box_177.pdf; Dragon Products, LTD Vacuum Box Brochure; Jul. 2017.

* cited by examiner

US 10,933,794 B1

HEATED SLURRY TRANSPORT SYSTEM

CROSS REFERENCE TO RELATED APPLICATIONS

Not applicable to this application.

STATEMENT REGARDING FEDERALLY SPONSORED RESEARCH OR DEVELOPMENT

Not applicable to this application.

BACKGROUND

Field

Example embodiments in general relate to a heated slurry transport system for receiving, transporting and unloading a cuttings slurry in a non-frozen manner in cold weather environments.

Related Art

Any discussion of the related art throughout the specification should in no way be considered as an admission that such related art is widely known or forms part of common general knowledge in the field.

Drill cuttings are produced during drilling of oil wells and gas wells. The drill cuttings are carried to the surface by a drilling fluid circulating up from the drill bit. The drill cuttings are separated from the drilling fluid so the recycled drilling fluid may be reused during the drilling process. The separated drill cuttings along with a portion of the drilling fluid and other liquids form a cuttings slurry that is transported to a vacuum tank (aka vacuum box) for holding until the vacuum box is full. Once the vacuum box is full of the cuttings slurry, the vacuum box is loaded upon a truck or trailer for transportation to a disposal site.

One type of vacuum box used in the oil and gas industry is a roll-off vacuum box with wheels on the bottom for rolling on and off a truck or trailer. In additional to vacuum boxes used in the oil and gas industry, vacuum trucks are used to receive and transport the cuttings slurry. Examples of vacuum tanks and vacuum trucks are illustrated in U.S. Pat. No. 6,179,070 to Dietzen titled "Vacuum Tank for Use in Handling Oil and Gas Well Cuttings", U.S. Pat. No. 5,564,509 to Dietzen titled "Oil and Gas Well Cuttings Disposal System", U.S. Pat. No. 8,328,290 to Malatesta titled "Expanded Size Sludge Vacuum Tanker", and U.S. Patent Publication No. 2018/0104,622 to Dawson titled "Waste Disposal Systems and Methods."

One problem with conventional vacuum boxes and vacuum trucks is that the cuttings slurry may freeze in cold weather environments such as Alaska and Canada making it difficult to unload the cuttings slurry from the vacuum box.

SUMMARY

An example embodiment is directed to a heated slurry transport system. The heated slurry transport system includes a portable tank having an interior surface, at least one wall, and a rear door. A layer of insulation surrounds at least a portion of the portable tank to help retain heat within the portable tank. A heating unit is attached to the portable tank and adapted to heat a fluid that is transferred through at least one heat loop attached to the portable tank to heat the interior of the portable tank and the contents of the portable tank.

There has thus been outlined, rather broadly, some of the embodiments of the heated slurry transport system in order that the detailed description thereof may be better understood, and in order that the present contribution to the art may be better appreciated. There are additional embodiments of the heated slurry transport system that will be described hereinafter and that will form the subject matter of the claims appended hereto. In this respect, before explaining at least one embodiment of the heated slurry transport system in detail, it is to be understood that the heated slurry transport system is not limited in its application to the details of construction or to the arrangements of the components set forth in the following description or illustrated in the drawings. The heated slurry transport system is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

Figure 1:
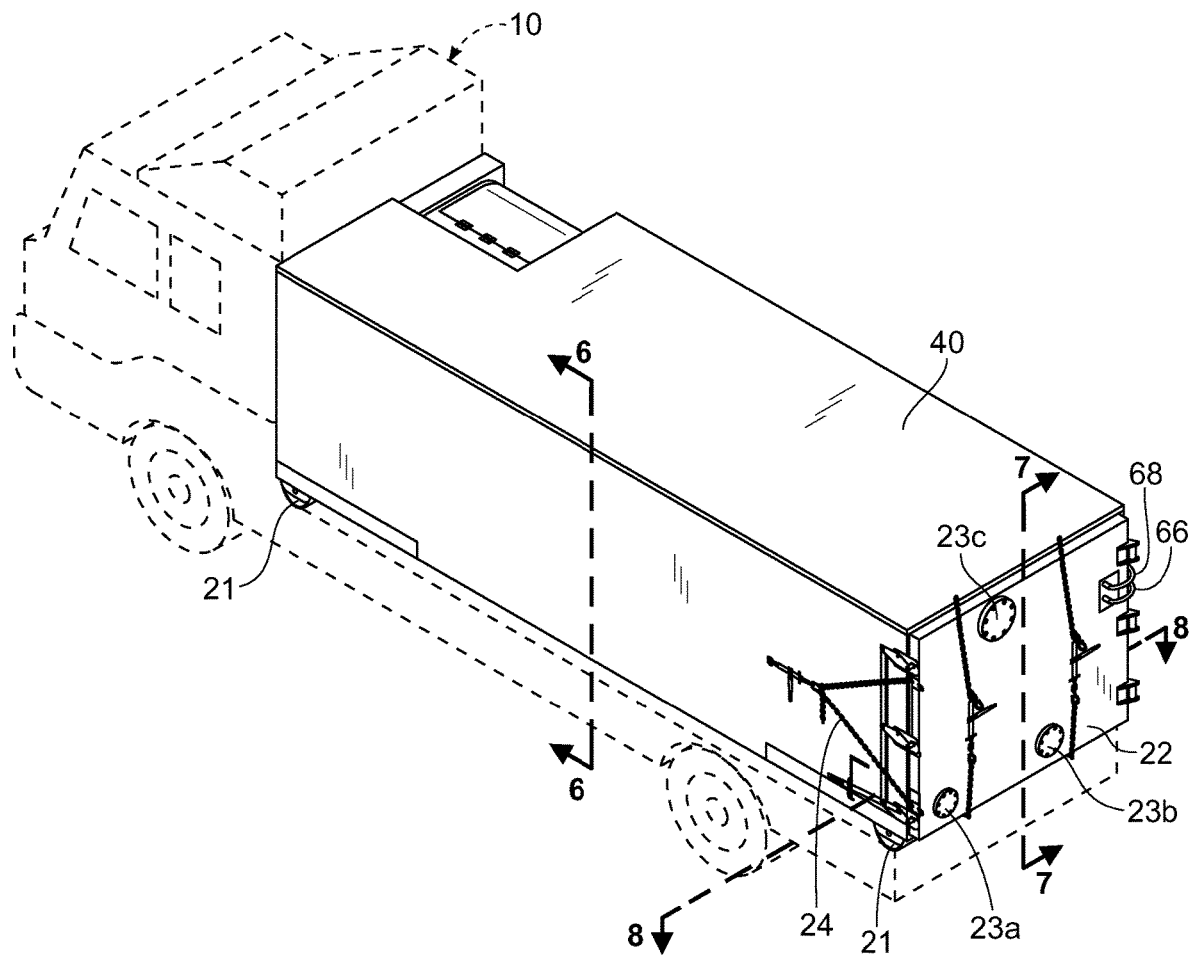
FIG. 1 is a perspective view of a heated slurry transport system in accordance with an example embodiment.

A. Overview.

An example heated slurry transport system generally comprises a portable tank 20 having an interior surface 27, at least one wall, and a rear door 22. A layer of insulation 30 surrounds at least a portion of the portable tank 20 to help retain heat within the portable tank 20. A heating unit 70 is attached to the portable tank 20 and adapted to heat a fluid that is transferred through at least one heat loop attached to the portable tank 20 to heat the interior of the portable tank 20 and the contents of the portable tank 20. While the various embodiments illustrate the invention being transportable using a vehicle, a stationary embodiment may also be implemented with the various embodiments disclosed herein.

B. Portable Tank.

FIGS. 3 through 8 illustrate an example embodiment of a portable tank 20. The portable tank 20 is adapted to be transported on or by a vehicle 10 (e.g. truck, tractor, trailer connected to a vehicle 10, etc.). The portable tank 20 is adapted to receive, transport and unload a volume of slurry material such as cuttings slurry 12 from an oil and gas drilling operation.

One suitable portable tank 20 for receiving, transporting and unloading a cuttings slurry 12 commonly used in the oil and gas industry is a portable vacuum container (e.g. dewatering vacuum box or vacuum box). The portable vacuum container is constructed of a rigid material (e.g. steel) and frame capable of withstanding a negative interior pressure (e.g. 15 to 65 kPa). A vacuum pump is fluidly connected to the portable vacuum container to create a desired vacuum pressure within the interior of the portable vacuum container. The vacuum pressure within the portable vacuum container may be used to suck the cuttings slurry 12 through a conduit into the vacuum container through a port 23c in the upper portion of the door as shown in FIGS. 1 through 4 of the drawings. Additional ports 23a, 23b may be used within the rear door 22 for various functions (e.g. injecting air into the cuttings slurry 12 to prevent settling of the drill cuttings during filling of the portable vacuum container).

Figure 2:
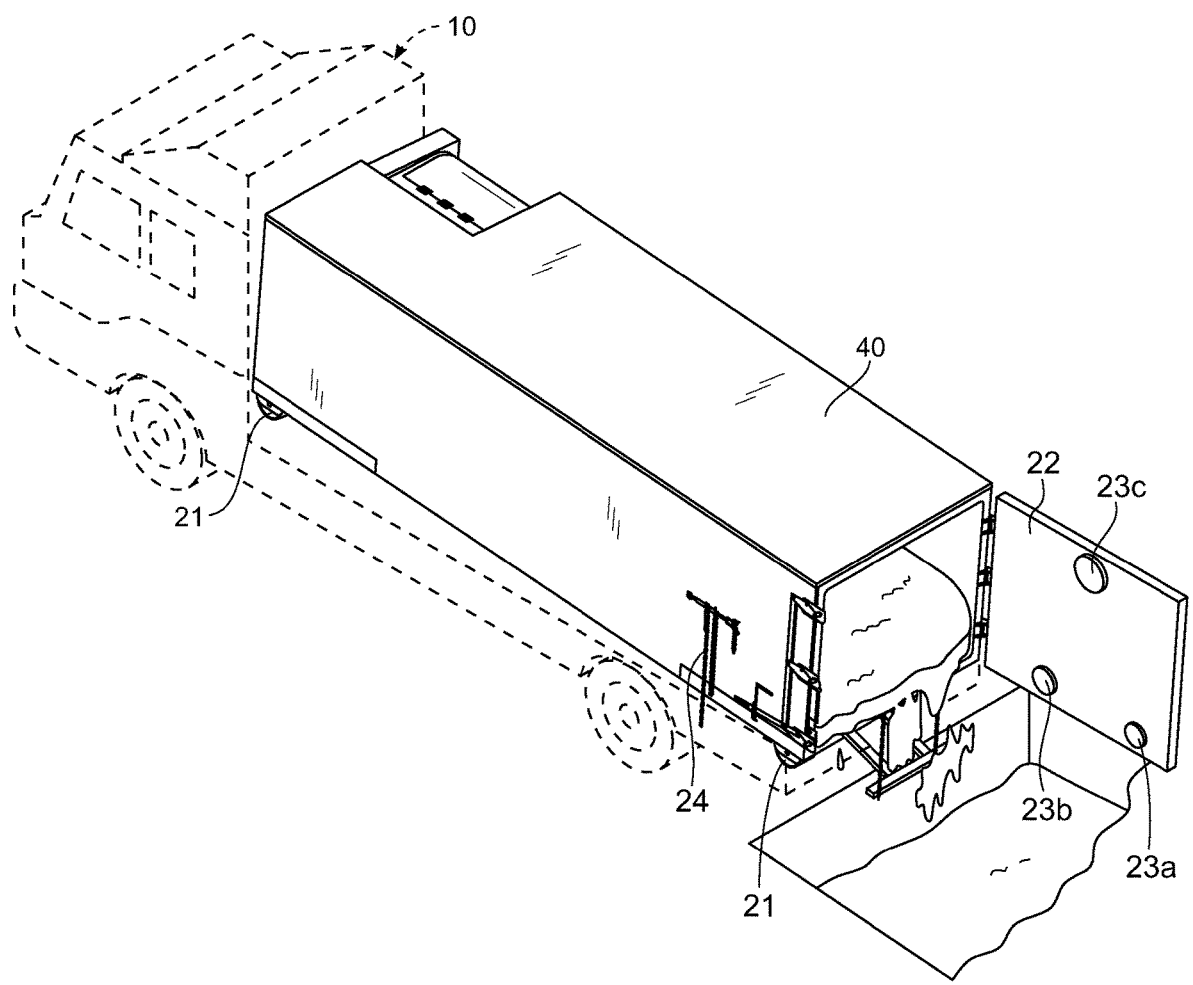
FIG. 2 is a perspective view of a heated slurry transport system with an end lifted upwardly and the rear door open to unload the cuttings slurry in accordance with an example embodiment.
Figure 3:
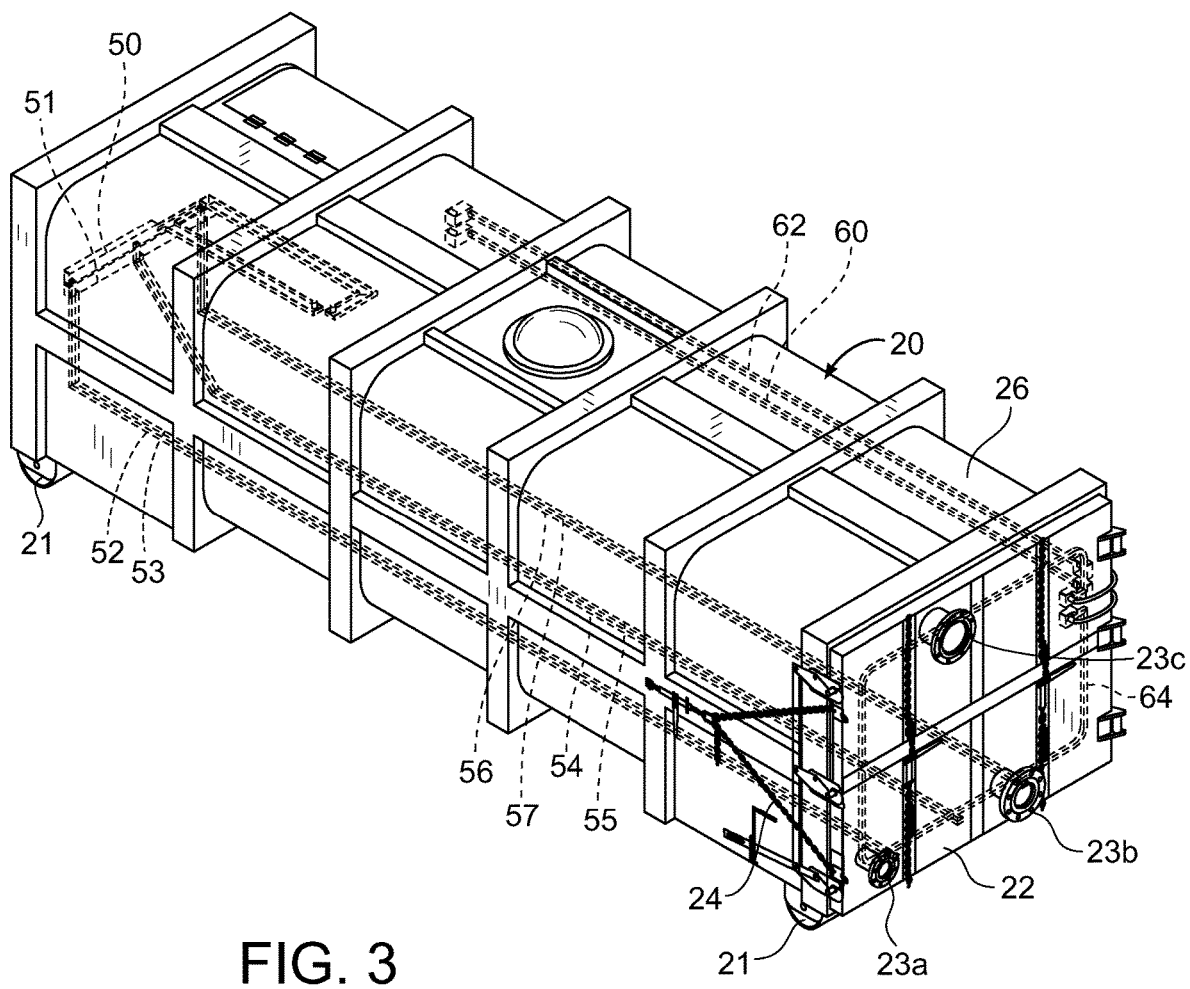
FIG. 3 is a perspective view of the heated slurry transport system with the heated lines on the interior surface of the tank in accordance with an example embodiment.
Figure 4:
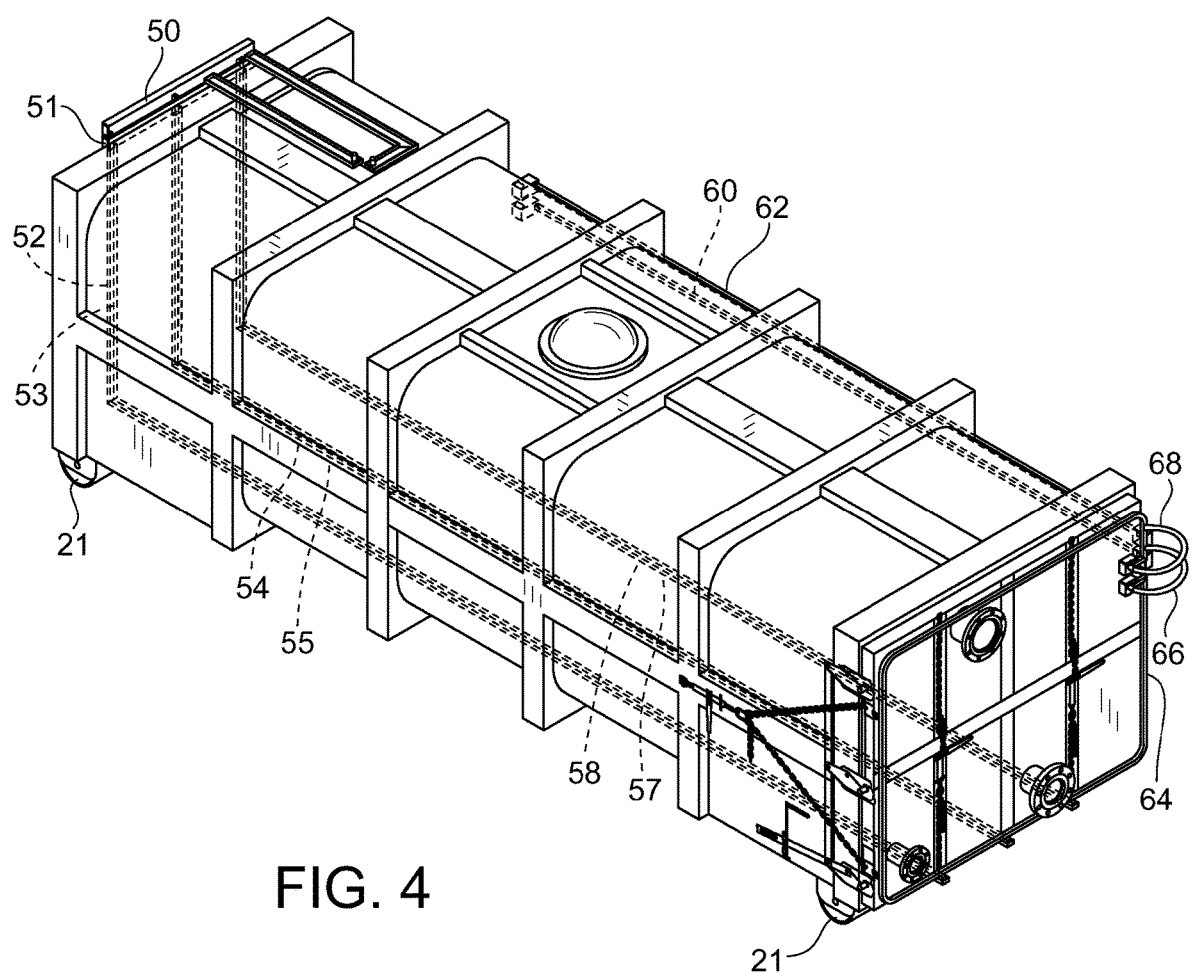
FIG. 4 is a perspective view of a heated slurry transport system with the heated lines on the exterior surface of the tank in accordance with another example embodiment.
Figure 5:
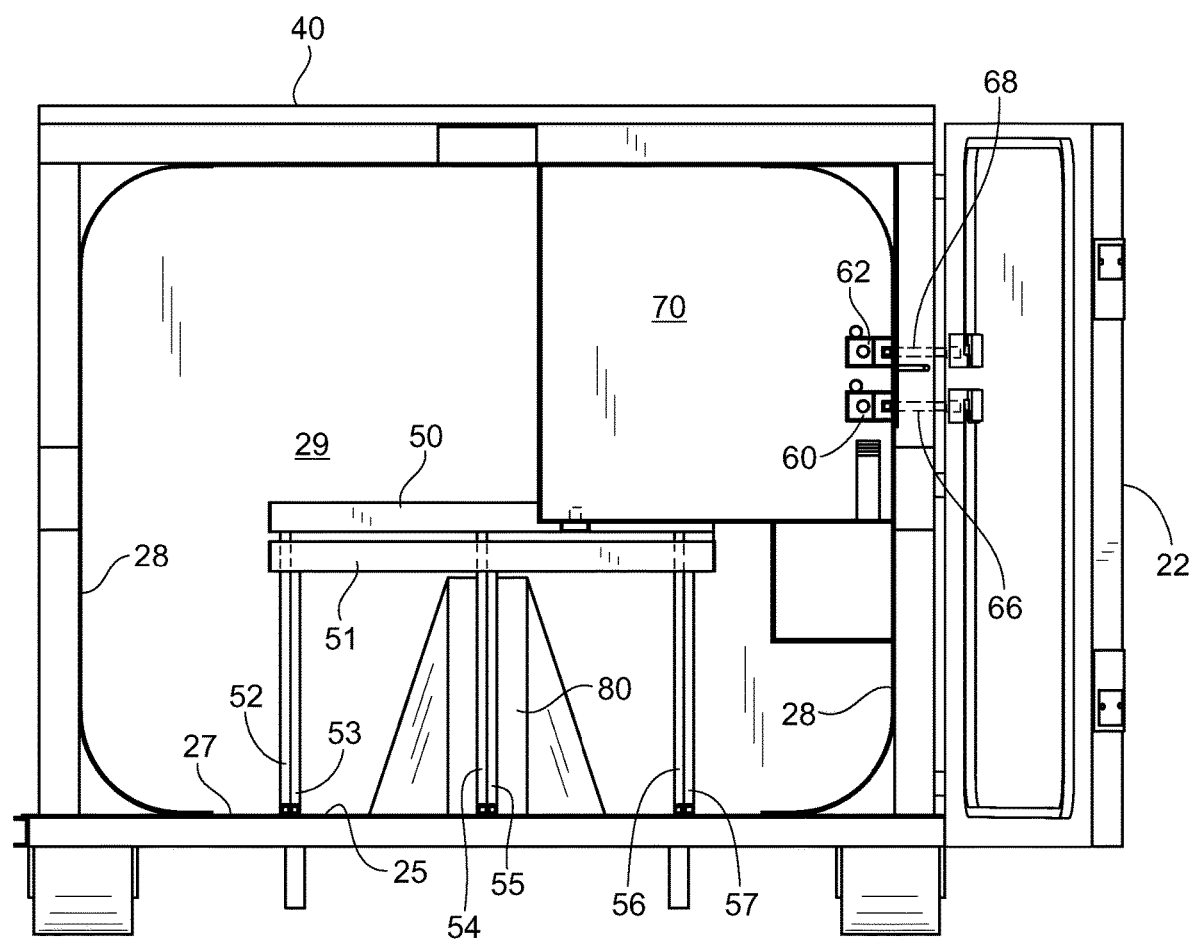
FIG. 5 is a rear view of the heated slurry transport system with the rear door open in accordance with an example embodiment.

FIGS. 3 and 4 illustrate an exemplary portable vacuum box having an interior surface 27, an exterior surface 26, a floor 25, a pair of sidewalls 28, a ceiling, a front wall 29 and a rear door 22. Exemplary portable vacuum boxes often times include wheels 21 extending from the floor 25 to allow for movement of the portable vacuum box on the ground, the vehicle 10 or a trailer connected to the vehicle 10. As further shown in FIGS. 3 and 4 of the drawings, the portable vacuum box may have a rectangular shaped structure but other shapes may be used. The rear door 22 may be pivotally attached to one of the sidewalls 28 by one or more hinges to allow for opening and closing as shown in FIGS. 3 through 5. A closure 24 is used to keep the rear door 22 closed and sealed with the vacuum box when receiving and transporting a cuttings slurry 12 or other material. The closure 24 may be a one or more latch assemblies (mechanical or hydraulic) used to keep the door closed. The closure 24 is released to allow the rear door 22 to open for unloading the cuttings slurry 12 from the interior of the vacuum box as shown in FIG. 2 of the drawings.

Various dimensions and interior volumes may be used for the portable vacuum box. For example, the portable vacuum box may have a length of 264 inches, a width of 96 inches and a height of 72½ inches. The interior volume of the portable vacuum box may vary also depending upon the amount of cuttings slurry 12 to be received, transported and unloaded (e.g. 20, 25 or 30 cubic yards).

Another suitable example of a portable tank 20 for receiving, transporting and unloading a cuttings slurry 12 commonly used in the oil and gas industry is a portable vacuum tank. An exemplary portable vacuum tank may have a hollow cylindrical shaped structure and have its own wheels 21 for transportation.

The following patents and published applications disclose vacuum tanks suitable for use with various embodiments herein and are expressly incorporated by reference herein: U.S. Pat. No. 6,179,070 to Dietzen titled "Vacuum Tank for Use in Handling Oil and Gas Well Cuttings", U.S. Pat. No. 5,564,509 to Dietzen titled "Oil and Gas Well Cuttings Disposal System", U.S. Pat. No. 8,328,290 to Malatesta titled "Expanded Size Sludge Vacuum Tanker", and U.S. Patent Publication No. 2018/0104,622 to Dawson titled "Waste Disposal Systems and Methods."

C. Insulation.

Figure 6:
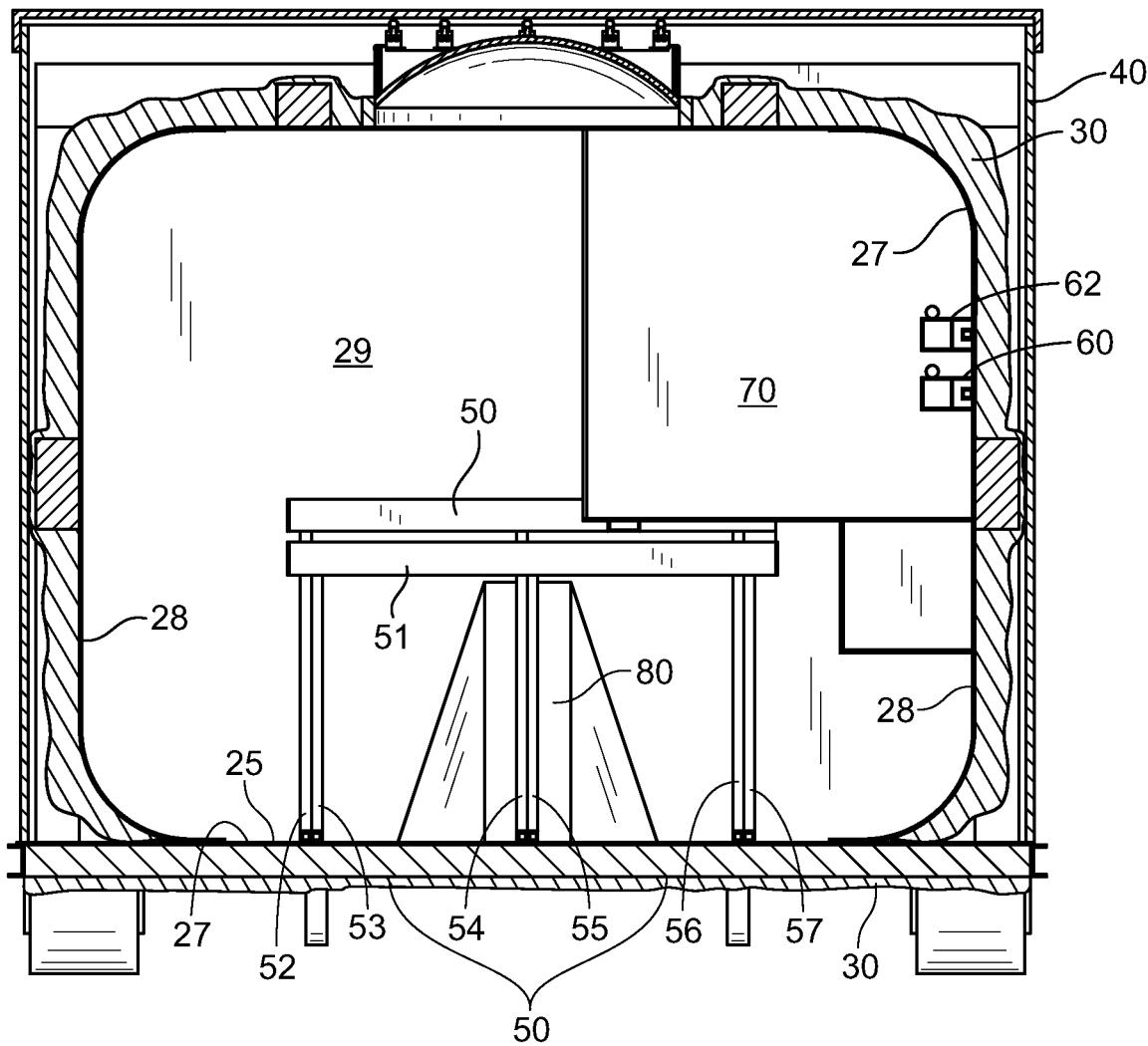
FIG. 6 is a cross sectional view taken along line 6-6 of FIG. 1.
Figure 8:
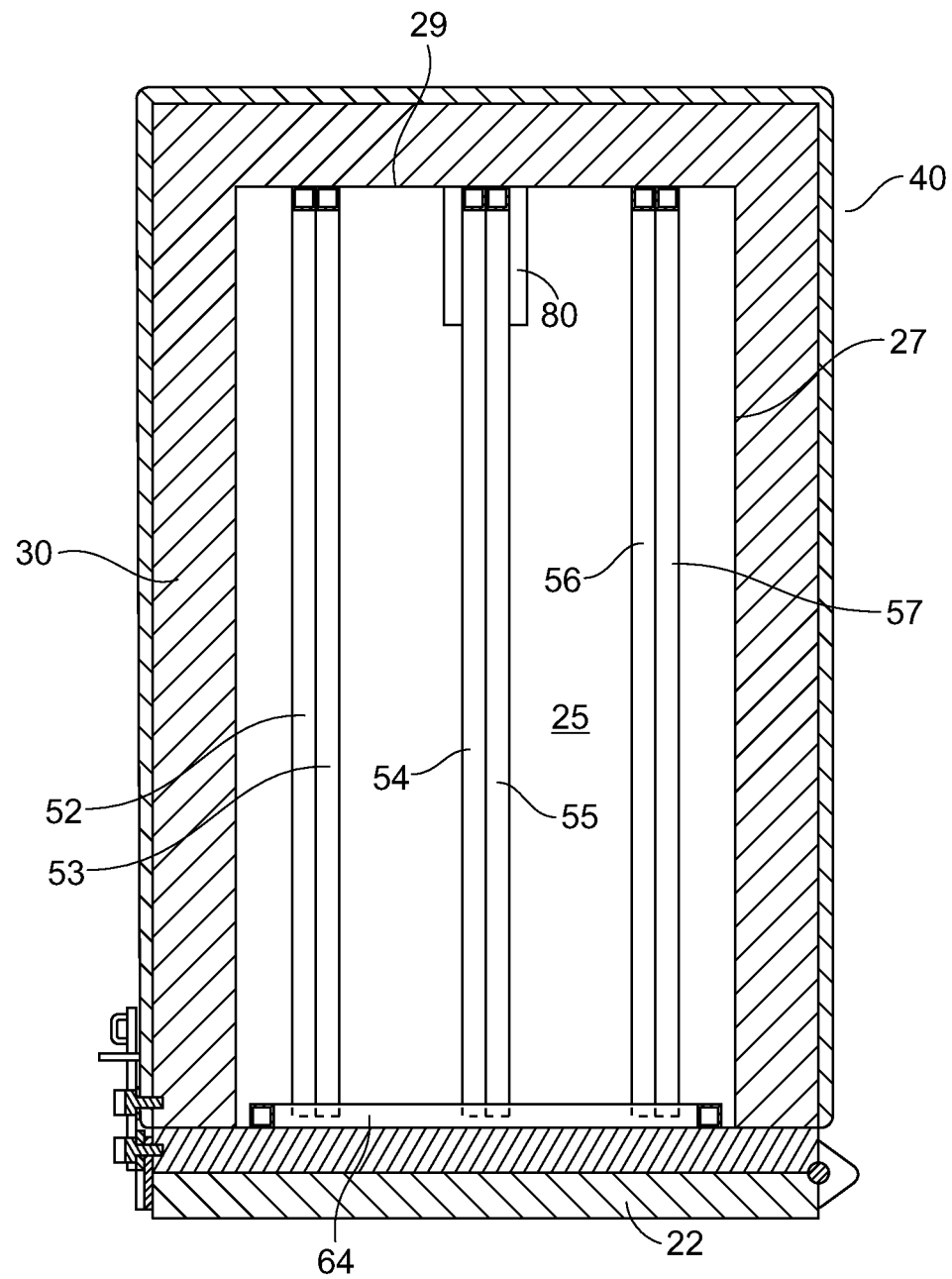
FIG. 8 is a cross sectional view taken along line 8-8 of FIG. 1.

A layer of insulation 30 surrounds at least a portion of the portable tank 20 on the exterior surface 26 of the portable tank 20. The insulation 30 may be any insulating material such as, but not limited to, high density polyurethane foam. In one exemplary embodiment, the layer of insulation 30 completely surrounds the exterior surface 26 of the portable vacuum box including the floor 25, sidewalls 28, ceiling and rear door 22 as shown in FIGS. 6 and 8 of the drawings. In one exemplary embodiment, a three inch layer of high density polyurethane foam is used for the layer of insulation 30. Various other thicknesses of insulation 30 may be used.

D. Exterior Casing.

An exterior casing 40 (e.g. metal) may surround the portable tank 20 and the insulation 30 surrounding the portable tank 20 as shown in FIGS. 1, 2, 5, 6, 7 and 8 of the figures. The exterior casing 40 protects the insulation 30 from damage and weathering.

E. Heating Unit.

A heating unit 70 is attached to the portable tank 20 and is adapted to heat a fluid producing a heated fluid flow that is used to heat the contents of the interior of the portable tank 20 to prevent freezing of the contents. The heating unit 70 may be any type of heating unit 70 such as, but not limited to, a diesel heater or propane heater that heats the fluid. An exemplary diesel heater suitable for use as a heating unit 70 is illustrated in U.S. Publication No. 20050284948 filed by International Thermal Investments Ltd (Distribution Module for Water Heater) and is incorporated by reference herein. The fluid heated by the heating unit 70 may be any type of fluid (gas or liquid) suitable for heating such as, but not limited to, glycol.

The heating unit 70 may be attached to the exterior of the portable tank 20. FIGS. 1, 2, 5, 6 and 7 illustrate a compartment extending into the portable tank 20 that receives the heating unit 70. The compartment may be comprised of a recess box to store the batteries, generator, boiler and fuel tank. A removable cover selectively encloses the compartment to provide access to the heating unit 70 by a user or repair persons as shown in FIGS. 1 and 2 of the drawings. Alternatively, the heating unit 70 may be attached to the vehicle 10.

F. Heat Transfer System.

1. Overview.

The fluid heated by the heating unit 70 is then transferred by a fluid pump or other fluid transfer device to a heat transfer system to transfer the heat from the heated fluid to the interior of the portable tank 20 and the cuttings slurry 12 within the portable tank 20 to prevent freezing of the cuttings slurry 12 when the portable tank 20 is in a cold weather climate where the temperature is at or below a freezing temperature.

The heating unit 70 is fluidly connected to one or more heat loops that are attached to the portable tank 20 on either the interior surface 27 or the exterior surface 26 of the portable tank 20. There can be any number of heat loops used to heat the portable tank 20 and the contents of the portable tank 20. The heat loops may be attached to the floor 25 as shown in FIGS. 3 through 8, the sidewalls 28, the ceiling and/or the rear door 22. The heat loops are fluidly connected to a supply port of the heating unit 70 that supplies the heated fluid and to a return port of the heating unit 70 that returns the cooled fluid to the heating unit 70 for reheating.

The exemplary embodiments shown in FIGS. 3 through 9 illustrate three heat loops attached to the floor 25 of the portable tank 20 and one heat loop attached to the rear door 22. More or less heat loops may be attached to the floor 25 and the rear door 22 than are shown in the drawings. Furthermore, a heat loop is not required to be attached to the rear door 22 and instead the rear door 22 may not have a heat loop. Furthermore, there may be heat loops attached to the sidewalls 28, the ceiling and the front wall 29 of the portable tank 20.

2. Manifolds Embodiment.

In one embodiment, a supply manifold 50 is fluidly connected to the supply port of the heating unit 70 to receive the heated fluid flow of the fluid and a return manifold 51 is fluidly connected to a return port of the heating unit 70 as shown in FIGS. 4 through 6 and 9 of the drawings. The supply manifold 50 distributes the heated fluid to a plurality of heat loops and the return manifold 51 collects the cooled fluid from the plurality of heat loops. The plurality of heat loops may be parallel (see FIGS. 5, 6, and 8) or non-parallel with one another. Furthermore, the plurality of heat loops may be directly connected to the heating unit 70 without using a supply manifold 50 or a return manifold 51.

3. First Heat Loop.

FIGS. 5 and 6 illustrate an exemplary first heat loop fluidly connected to the supply manifold 50 and the return manifold 51. The first heat loop is attached to the floor 25 of the portable tank 20 (exterior surface 26 or interior surface 27) and circulates the heated fluid flow of the fluid to heat the floor 25 and the interior contents of the portable tank 20 (e.g. cuttings slurry 12). The first heat loop is comprised of a first supply line 52 fluidly connected to the supply manifold 50 and a first return line 53 fluidly connected to the return manifold 51 as further shown in FIGS. 5 and 6 of the drawings. Alternatively, the first supply line 52 may be connected to the supply port of the heating unit 70 and the first return line 53 may be connected to the return port of the heating unit 70.

In one embodiment, when the first heat loop is attached to the interior surface 27 (e.g. floor 25, sidewalls 28, ceiling) of the portable tank 20, the first supply line 52 is preferably adjacent to and parallel to the first return line 53 to prevent the accumulation of or resistance to the unloading of the cuttings slurry 12 during unloading. As best shown in FIG. 8, the first supply line 52 and the first return line 53 are preferably straight forming a unitary straight structure to allow for limited resistance to the unloading of the cuttings slurry 12 when attached to the interior surface 27 of the portable tank 20. In another embodiment, there is no space between the first supply line 52 and the first return line 53 to prevent the accumulation of or resistance to the unloading of the cuttings slurring during unloading as shown in FIGS. 5, 6 and 8 of the drawings. It is preferable when the first heating loop is attached to the interior surface 27 of the portable tank 20 that the first heating loop has a straight structure that is parallel with respect to the longitudinal axis of the portable tank 20 as shown in FIG. 8 of the drawings.

When the first heat loop is attached to the exterior surface 26 of the portable tank 20 (FIG. 4) or embedded within the floor 25 or sidewalls 28 of the portable tank 20, there is no advantage to have the first supply line 52 and the first return line 53 adjacent to one another since they are not in contact with the cuttings slurry 12. It should also be noted that the first heat loop does not need to be a straight structure and the first supply line 52 does not need to be adjacent to the first return line 53 even when the first heat loop is attached to the interior surface 27 of the portable tank 20. The first heat loop also may extend upwardly at an angle along the angled portion 80 of the portable tank 20 and upwardly along a portion of the front wall 29.

Figure 7:
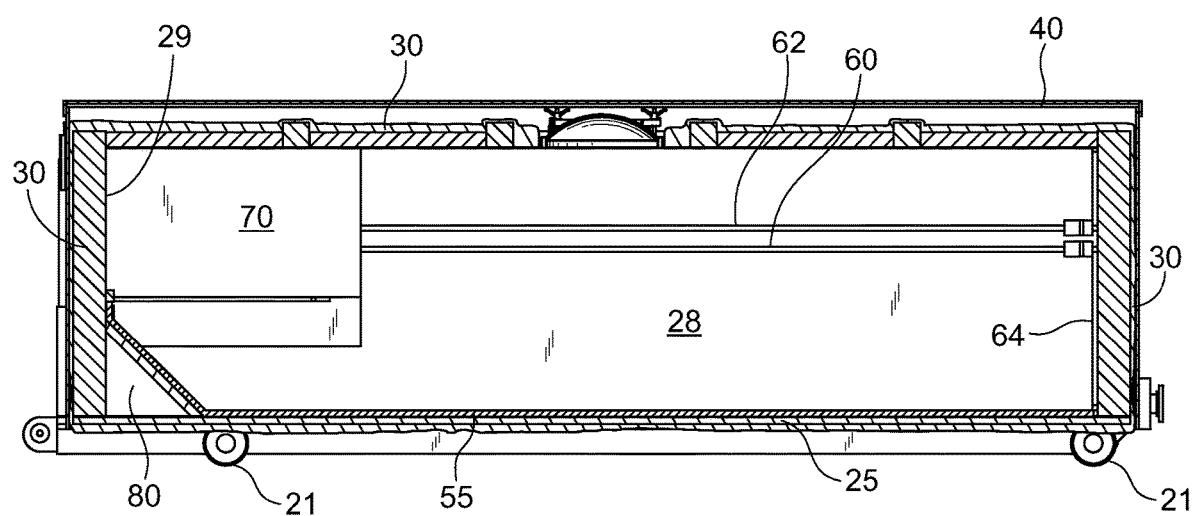
FIG. 7 is a cross sectional view taken along line 7-7 of FIG. 1.
Figure 9:
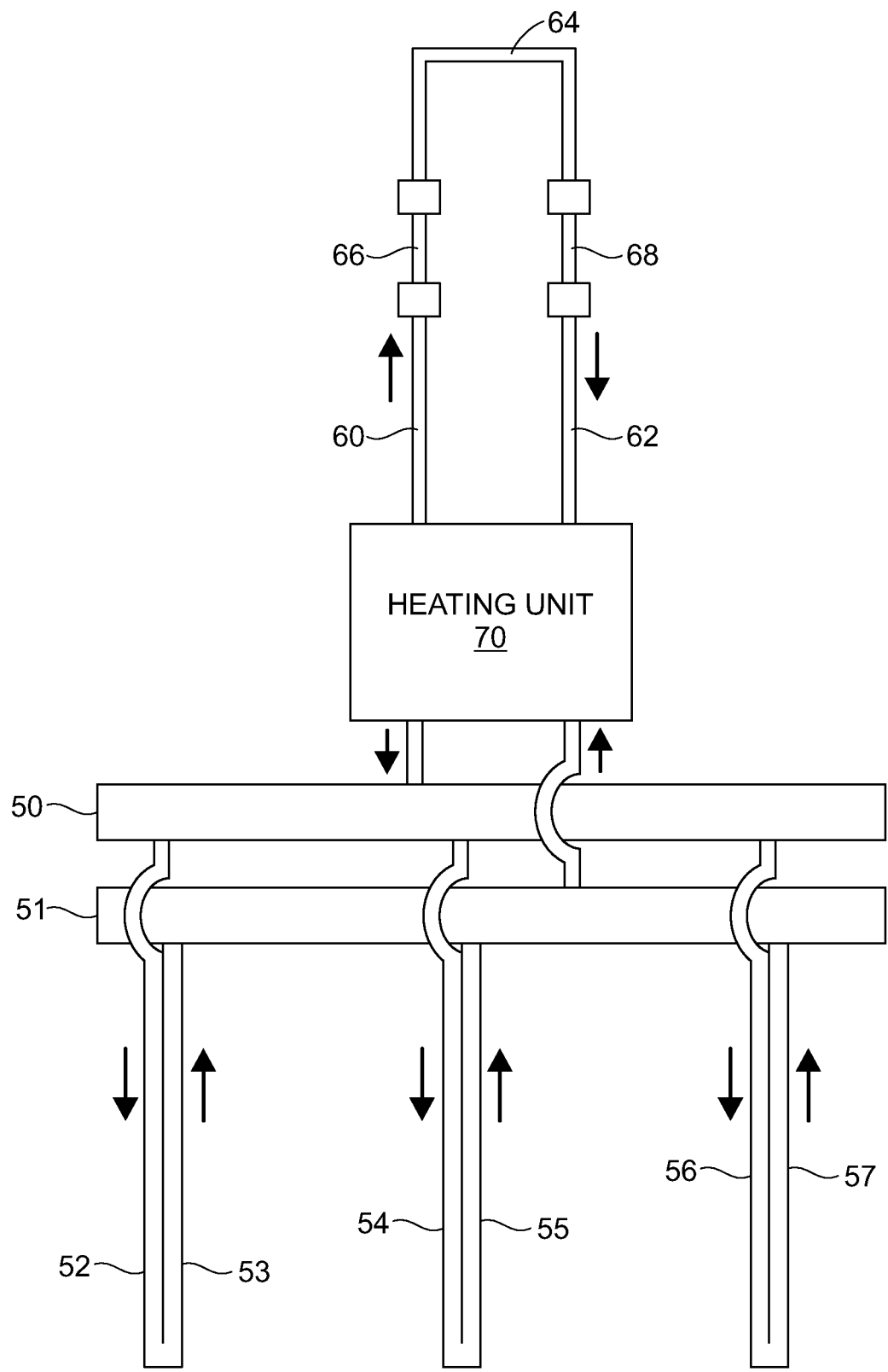
FIG. 9 is a line diagram illustrating the fluid connections of the heat lines with the heating unit.

The first heat loop may be constructed of various types of conduit. One type of conduit suitable for the first heat loop is metal square tubing that is welded or attached with fasteners to the portable tank 20. In one exemplary embodiment, the first supply line 52 and the first return line 53 may each be constructed of a length of metal square tubing that are attached together and the portable tank 20 with no space between the square tubes as shown in FIGS. 5, 6 and 8 of the drawings. The front portions of the first heat loop extend to the front wall 29 and upwardly along the front wall 29 as shown in FIGS. 5 through 8 of the drawings. In one embodiment, the rear portions of the first heat loop extend along the floor 25 to near the rear opening formed by the rear door 22 as shown in FIGS. 7 and 8 of the drawings. The rear portions of the metal square tubing forming the first supply line 52 and the first return line 53 are fluidly connected together to allow for the flow of the heated fluid from the first supply line 52 to the first return line 53 as shown in FIG. 9 of the drawings.

4. Second Heat Loop.

FIGS. 5 and 6 illustrate an exemplary second heat loop fluidly connected to the supply manifold 50 and the return manifold 51. The second heat loop is attached to the floor 25 of the portable tank 20 (exterior surface 26 or interior surface 27) and circulates the heated fluid flow of the fluid to heat the floor 25 and the interior contents of the portable tank 20 (e.g. cuttings slurry 12). The second heat loop is comprised of a second supply line 54 fluidly connected to the supply manifold 50 and a second return line 55 fluidly connected to the return manifold 51 as further shown in FIGS. 5 and 6 of the drawings. Alternatively, the second supply line 54 may be connected to the supply port of the heating unit 70 and the second return line 55 may be connected to the return port of the heating unit 70.

In one embodiment, when the second heat loop is attached to the interior surface 27 (e.g. floor 25, sidewalls 28, ceiling) of the portable tank 20, the second supply line 54 is preferably adjacent to and parallel to the second return line 55 to prevent the accumulation of or resistance to the unloading of the cuttings slurry 12 during unloading. As best shown in FIG. 8, the second supply line 54 and the second return line 55 are preferably straight forming a unitary straight structure to allow for limited resistance to the unloading of the cuttings slurry 12 when attached to the interior surface 27 of the portable tank 20. In another embodiment, there is no space between the second supply line 54 and the second return line 55 to prevent the accumulation of or resistance to the unloading of the cuttings slurring during unloading as shown in FIGS. 5, 6 and 8 of the drawings. It is preferable when the second heating loop is attached to the interior surface 27 of the portable tank 20 that the second heating loop has a straight structure that is parallel with respect to the longitudinal axis of the portable tank 20 as shown in FIG. 8 of the drawings.

When the second heat loop is attached to the exterior surface 26 of the portable tank 20 (FIG. 4) or embedded within the floor 25 or sidewalls 28 of the portable tank 20, there is no advantage to have the second supply line 54 and the second return line 55 adjacent to one another since they are not in contact with the cuttings slurry 12. It should also be noted that the second heat loop does not need to be a straight structure and the second supply line 54 does not need to be adjacent to the second return line 55 even when the second heat loop is attached to the interior surface 27 of the portable tank 20.

The second heat loop may be constructed of various types of conduit. One type of conduit suitable for the second heat loop is metal square tubing that is welded or attached with fasteners to the portable tank 20. In one exemplary embodiment, the second supply line 54 and the second return line 55 may each be constructed of a length of metal square tubing that are attached together and the portable tank 20 with no space between the square tubes as shown in FIGS. 5, 6 and 8 of the drawings. The front portions of the second heat loop extend to the front wall 29 and upwardly along the front wall 29 as shown in FIGS. 5 through 8 of the drawings. In one embodiment, the rear portions of the second heat loop extend along the floor 25 to near the rear opening formed by the rear door 22 as shown in FIGS. 7 and 8 of the drawings. The rear portions of the metal square tubing forming the second supply line 54 and the second return line 55 are fluidly connected together to allow for the flow of the heated fluid from the second supply line 54 to the second return line 55 as shown in FIG. 9 of the drawings.

5. Third Heat Loop.

FIGS. 5 and 6 illustrate an exemplary third heat loop fluidly connected to the supply manifold 50 and the return manifold 51. The third heat loop is attached to the floor 25 of the portable tank 20 (exterior surface 26 or interior surface 27) and circulates the heated fluid flow of the fluid to heat the floor 25 and the interior contents of the portable tank 20 (e.g. cuttings slurry 12). The third heat loop is comprised of a third supply line 56 fluidly connected to the supply manifold 50 and a third return line 57 fluidly connected to the return manifold 51 as further shown in FIGS. 5 and 6 of the drawings. Alternatively, the third supply line 56 may be connected to the supply port of the heating unit 70 and the third return line 57 may be connected to the return port of the heating unit 70.

In one embodiment, when the third heat loop is attached to the interior surface 27 (e.g. floor 25, sidewalls 28, ceiling) of the portable tank 20, the third supply line 56 is preferably adjacent to and parallel to the third return line 57 to prevent the accumulation of or resistance to the unloading of the cuttings slurry 12 during unloading. As best shown in FIG. 8, the third supply line 56 and the third return line 57 are preferably straight forming a unitary straight structure to allow for limited resistance to the unloading of the cuttings slurry 12 when attached to the interior surface 27 of the portable tank 20. In another embodiment, there is no space between the third supply line 56 and the third return line 57 to prevent the accumulation of or resistance to the unloading of the cuttings slurring during unloading as shown in FIGS. 5, 6 and 8 of the drawings. It is preferable when the third heating loop is attached to the interior surface 27 of the portable tank 20 that the third heating loop has a straight structure that is parallel with respect to the longitudinal axis of the portable tank 20 as shown in FIG. 8 of the drawings.

When the third heat loop is attached to the exterior surface 26 of the portable tank 20 (FIG. 4) or embedded within the floor 25 or sidewalls 28 of the portable tank 20, there is no advantage to have the third supply line 56 and the third return line 57 adjacent to one another since they are not in contact with the cuttings slurry 12. It should also be noted that the third heat loop does not need to be a straight structure and the third supply line 56 does not need to be adjacent to the third return line 57 even when the third heat loop is attached to the interior surface 27 of the portable tank 20.

The third heat loop may be constructed of various types of conduit. One type of conduit suitable for the third heat loop is metal square tubing that is welded or attached with fasteners to the portable tank 20. In one exemplary embodiment, the third supply line 56 and the third return line 57 may each be constructed of a length of metal square tubing that are attached together and the portable tank 20 with no space between the square tubes as shown in FIGS. 5, 6 and 8 of the drawings. The front portions of the third heat loop extend to the front wall 29 and upwardly along the front wall 29 as shown in FIGS. 5 through 8 of the drawings. In one embodiment, the rear portions of the third heat loop extend along the floor 25 to near the rear opening formed by the rear door 22 as shown in FIGS. 7 and 8 of the drawings. The rear portions of the metal square tubing forming the third supply line 56 and the third return line 57 are fluidly connected together to allow for the flow of the heated fluid from the third supply line 56 to the third return line 57 as shown in FIG. 9 of the drawings.

6. Door Heat Loop.

FIGS. 3, 5, 7 and 8 illustrate a heat loop attached to the interior surface 27 of the rear door 22 of the portable tank 20 and FIG. 4 illustrates an exemplary heat loop attached to the exterior surface 26 of the rear door 22 of the portable tank 20. As shown in FIGS. 3, 4, 5 and 9 of the drawings, a door supply line 60 is fluidly connected to the supply port of the heating unit 70 and a door return line 62 is fluidly connected to the return port of the heating unit 70. The door supply line 60 may alternatively be fluidly connected to the supply manifold 50 and the door return line 62 may alternatively be fluidly connected to the return manifold 51.

A door line 64 is fluidly connected to the door supply line 60 and the door return line 62 to transfer the heated fluid from the door supply line 60 to the door return line 62. The door line 64 is attached to the rear door 22 either on the interior surface 27 of the rear door 22 (FIG. 3), the exterior surface 26 of the rear door 22 (FIG. 4) or embedded within the rear door 22. In one embodiment, the door line 64 is preferably constructed of a metal square tube welded or attached with fasteners to the rear door 22. If the door line 64 is comprised of a rigid material (e.g. metal square tube), a flexible supply hose 66 and a flexible return hose 68 are fluidly connected between the door line 64 and the door supply line 60 and door return line 62 respectively near the hinged location of the rear door 22 as shown in FIGS. 3 through 5 of the drawings. In the exemplary embodiment shown in FIGS. 3 through 5 of the drawings, the door line 64 may extend around the rear door 22 near the perimeter of the door in a loop shaped manner. Various alternative loop designs may be used for the door line 64. More than one door line 64 may also be used with the rear door 22 having a plurality of heat loops instead of only one heat loop.

G. Operation of Preferred Embodiment.

In use, the portable tank 20 is positioned near an oil and gas drilling operation to receive a cuttings slurry 12 from the drilling operations. A negative pressure is created within the interior of the portable tank 20 by a vacuum unit fluidly connected to the portable tank 20. The negative pressure creates a suction force that draws in the cuttings slurry 12 into the interior of the portable tank 20 through one of the port 23*c* in the rear door 22. The heating unit 70 is also activated to heat the fluid which is transferred through the heat loops extending through the portable tank 20. As the heated fluid is transferred through the heat loops, the heat is transferred from the heat loops to the portable tank 20 and the contents (e.g. cuttings slurry 12) of the portable tank 20 thereby preventing freezing of the contents. Once the portable tank 20 is full, the portable tank 20 is then loaded onto a vehicle 10 (if not already on a vehicle 10 or trailer) and then transported to a waste disposal site. During transportation, the heating unit 70 may remain active to prevent freezing of the cuttings slurry 12 during transportation within cold weather climates. Once at the waste disposal site, the cuttings slurry 12 is unloaded by either the lower ports 23*a*, 23*b* or by opening the rear door 22 along with elevating the front end of the portable tank 20 as shown in FIG. 2 of the drawings. Once the cuttings slurry 12 is removed, the rear door 22 is closed again and then the portable tank 20 is returned to the drilling operation to be refilled again with a new volume of cuttings slurry 12.

Unless otherwise defined, all technical and scientific terms used herein have the same meaning as commonly understood by one of ordinary skill in the art to which this invention belongs. Although methods and materials similar to or equivalent to those described herein can be used in the practice or testing of the heated slurry transport system, suitable methods and materials are described above. All publications, patent applications, patents, and other references mentioned herein are incorporated by reference in their entirety to the extent allowed by applicable law and regulations. The heated slurry transport system may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A heated portable vacuum box for transporting a cuttings slurry in cold weather climates without freezing, comprising:
   a portable vacuum box having an interior surface, an exterior surface, a floor, a pair of sidewalls, a ceiling, a front wall and a rear door, wherein the portable vacuum box is transportable by a vehicle;
   a layer of insulation surrounding at least a portion of the portable vacuum box;
   a heating unit attached to the portable vacuum box, wherein the heating unit is adapted to heat a fluid producing a heated fluid flow;
   a supply manifold fluidly connected to a supply port of the heating unit to receive the heated fluid flow of the fluid;
   a return manifold fluidly connected to a return port of the heating unit;
   a first heat loop fluidly connected to the supply manifold and the return manifold, wherein the first heat loop is attached to the floor of the portable vacuum box, and wherein the first heat loop circulates the heated fluid flow of the fluid to heat the floor; and
   a second heat loop fluidly connected to the supply manifold and the return manifold, wherein the second heat loop is attached to the floor of the portable vacuum box, and wherein the second heat loop circulates the heated fluid flow of the fluid to heat the floor.

2. The heated portable vacuum box of claim 1, wherein the portable vacuum box is comprised of a rectangular shaped structure.

3. The heated portable vacuum box of claim 1, wherein the layer of insulation completely surrounds the exterior surface of the portable vacuum box.

4. The heated portable vacuum box of claim 1, wherein the fluid is comprised of glycol.

5. The heated portable vacuum box of claim 1, including a third heat loop fluidly connected to the supply manifold and the return manifold, wherein the third heat loop is attached to the floor of the portable vacuum box, and wherein the third heat loop circulates the heated fluid flow of the fluid to heat the floor.

6. The heated portable vacuum box of claim 5, wherein the first heat loop is comprised of a first supply line fluidly connected to the supply manifold and a first return line fluidly connected to the return manifold, wherein the second heat loop is comprised of a second supply line fluidly connected to the supply manifold and a second return line fluidly connected to the return manifold, and wherein the third heat loop is comprised of a third supply line fluidly connected to the supply manifold and a third return line fluidly connected to the return manifold.

7. The heated portable vacuum box of claim 6, wherein the first supply line is adjacent to and parallel to the first return line, wherein the second supply line is adjacent to and parallel to the second return line, and wherein the third supply line is adjacent to and parallel to the third return line.

8. The heated portable vacuum box of claim 7, wherein there is no space between the first supply line and the first return line, wherein there is no space between the second supply line and the second return line and wherein there is no space between the third supply line and the third return line.

9. The heated portable vacuum box of claim 5, wherein the first heat loop, the second heat loop and the third heat loop are each straight.

10. The heated portable vacuum box of claim 9, wherein the first heat loop, the second heat loop and the third heat loop are all parallel with one another.

11. The heated portable vacuum box of claim 1, wherein the first heat loop is comprised of a first supply line fluidly connected to the supply manifold and a first return line fluidly connected to the return manifold, and wherein the second heat loop is comprised of a second supply line fluidly connected to the supply manifold and a second return line fluidly connected to the return manifold.

12. The heated portable vacuum box of claim 11, wherein the first supply line is adjacent to and parallel to the first return line, and wherein the second supply line is adjacent to and parallel to the second return line.

13. The heated portable vacuum box of claim 12, wherein there is no space between the first supply line and the first return line, and wherein there is no space between the second supply line and the second return line.

14. The heated portable vacuum box of claim 1, wherein the first heat loop and the second heat loop are each straight.

15. The heated portable vacuum box of claim 14, wherein the first heat loop, the second heat loop and the third heat loop are all parallel with one another.

16. The heated portable vacuum box of claim 15, wherein the first heat loop and the second heat loop are both parallel with respect to a longitudinal axis of the portable vacuum box.

17. The heated portable vacuum box of claim 16, wherein the first heat loop and the second heat loop are attached to the interior surface of the portable vacuum box.

18. The heated portable vacuum box of claim 1, wherein the first heat loop and the second heat loop are attached to the exterior surface of the portable vacuum box.

19. The heated portable vacuum box of claim 1, including a door supply line fluidly connected to the supply port of the heating unit or the supply manifold, a door return line fluidly connected to the return port of the heating unit or the return manifold, and a door line fluidly connected to the door supply line and the door return line, wherein the door line is attached to the door of the portable vacuum box.

20. A heated portable vacuum box for transporting a cuttings slurry in cold weather climates without freezing, comprising:
- a portable vacuum box having an interior surface, an exterior surface, a floor, a pair of sidewalls, a ceiling, a front wall and a rear door, wherein the portable vacuum box is transportable by a vehicle;
- wherein the portable vacuum box is comprised of a rectangular shaped structure;
- a layer of insulation surrounding at least a portion of the portable vacuum box;
- a heating unit attached to the portable vacuum box, wherein the heating unit is adapted to heat a fluid producing a heated fluid flow;
- a supply manifold fluidly connected to a supply port of the heating unit to receive the heated fluid flow of the fluid;
- a return manifold fluidly connected to a return port of the heating unit;
- a first heat loop fluidly connected to the supply manifold and the return manifold, wherein the first heat loop is attached to the floor of the portable vacuum box, and wherein the first heat loop circulates the heated fluid flow of the fluid to heat the floor;
- a second heat loop fluidly connected to the supply manifold and the return manifold, wherein the second heat loop is attached to the floor of the portable vacuum box, and wherein the second heat loop circulates the heated fluid flow of the fluid to heat the floor;
- a third heat loop fluidly connected to the supply manifold and the return manifold, wherein the third heat loop is attached to the floor of the portable vacuum box, and wherein the third heat loop circulates the heated fluid flow of the fluid to heat the floor;
- wherein the first heat loop is comprised of a first supply line fluidly connected to the supply manifold and a first return line fluidly connected to the return manifold, wherein the second heat loop is comprised of a second supply line fluidly connected to the supply manifold and a second return line fluidly connected to the return manifold, and wherein the third heat loop is comprised of a third supply line fluidly connected to the supply manifold and a third return line fluidly connected to the return manifold;
- wherein the first supply line is adjacent to and parallel to the first return line, wherein the second supply line is adjacent to and parallel to the second return line, and wherein the third supply line is adjacent to and parallel to the third return line;
- wherein there is no space between the first supply line and the first return line, wherein there is no space between the second supply line and the second return line and wherein there is no space between the third supply line and the third return line;
- wherein the first heat loop, the second heat loop and the third heat loop are each straight;
- wherein the first heat loop, the second heat loop and the third heat loop are all parallel with one another;
- wherein the first heat loop, the second heat loop and the third heat loop are attached to the interior surface of the portable vacuum box;
- wherein the first heat loop, the second heat loop and the third heat loop are each parallel with respect to a longitudinal axis of the portable vacuum box;
- a door supply line fluidly connected to the supply port of the heating unit or the supply manifold, a door return line fluidly connected to the return port of the heating unit or the return manifold, and a door line fluidly connected to the door supply line and the door return line, wherein the door line is attached to the door of the portable vacuum box.

* * * * *